United States Patent [19]

Dohogne

[11] Patent Number: 4,847,527

[45] Date of Patent: Jul. 11, 1989

[54] HALL EFFECT ASSEMBLY FOR MOUNTING TO STATORS

[75] Inventor: L. Ranney Dohogne, St. Louis, Mo.

[73] Assignee: Emerson Electric Co., St. Louis, Mo.

[21] Appl. No.: 282,395

[22] Filed: Dec. 9, 1988

[51] Int. Cl.[4] .......................... H02K 1/18; H02K 1/28
[52] U.S. Cl. .................................. 310/218; 310/68 B; 310/71; 310/68 D; 324/208; 324/173
[58] Field of Search ...................... 310/71, 68 R, 68 B, 310/DIG. 3, 254, 91; 324/208, 173, 174

[56] References Cited

U.S. PATENT DOCUMENTS

| | | | |
|---|---|---|---|
| 4,481,436 | 11/1984 | Renaud et al. | 310/68 B |
| 4,677,329 | 6/1987 | Secoura | 310/71 |
| 4,724,347 | 2/1988 | Reinhardt | 310/71 |
| 4,769,600 | 9/1988 | Ito | 324/208 |

FOREIGN PATENT DOCUMENTS 2111086 9/1972 Fed. Rep. of Germany ........ 310/68

Primary Examiner—Patrick R. Salce
Assistant Examiner—Tien M. Nguyen
Attorney, Agent, or Firm—Polster, Polster and Lucchesi

[57] ABSTRACT

A device for precisely positioning at least one hall effect sensor in a dynamoelectric machine. The hall sensor is mounted in an assembly. The assembly includes an enclosure having at least one locator tang projecting outwardly from the enclosure. The motor includes a stator assembly having a rotor receiving bore formed in it, and a plurality or radially outwardly extending winding receiving slots. The tangs are inserted into at least one slot of the stator assembly. Placement of the device as indicated accurately positions the hall effect sensor for proper motor operation.

17 Claims, 2 Drawing Sheets

HALL EFFECT ASSEMBLY FOR MOUNTING TO STATORS

BACKGROUND OF THE INVENTION

This invention relates to dynamoelectric machines, and in particular, to a device for precisely mounting a hall effect sensor on a stator assembly of an electric motor. While the invention is described with particular reference to such application, those skilled in the art will recognize the wider applicability of the inventive principles disclosed hereinafter.

As is well known in the art, hall effect sensors often are used in conjunction with the operation of brushless permanent magnet motors. Such motors typically include a stator assembly and a rotor assembly. Permanent magnets are mounted to the rotor assembly, and their passage across the hall effect sensor enables associated circuitry to determine the position of the rotor. Rotor position is used to control energization of the motor windings for proper motor operation. It has been common, in the past, to mount the hall effect assembly to the endshield or end bell of the motor. The motor endshields, in general, are used to house at least one bearing which supports a shaft and rotor. Proper location of the hall effect sensor both with respect to the stator and to the associated rotor magnets required that the endshield, or a device mounted to the end shield, be adjusted during the motor assembly process. Such adjustment is time consuming, and adds to product cost. More importantly, it is difficult to accurately locate the sensor when so mounted, with resultant degradation in motor operation.

One of the objects of this invention is to provide a low cost hall effect assembly for a dynamoelectric machine.

Another object of the invention is to provide a hall effect assembly for a dynamoelectric machine which precisely positions the hall effect sensors utilized in conjunction therewith.

Another object of this invention is provide a hall effect assembly which allows easy construction of the assembly itself.

It is another object of this invention to provide a hall effect assembly which positionally is self maintain with respect to an associated stator assembly.

Another object of this invention is to provide an enclosure for accommodating a plurality of hall effect sensors.

SUMMARY OF THE INVENTION

In accordance with this invention, generally stated, a device for mounting at least one hall effect sensor to a dynamoelectric machine is provided in which the device includes an enclosure having a plurality of tangs extending outwardly from it. The tangs are positioned into the winding receiving slots of a stator assembly for a dynamoelectric machine. Placement of the tangs in the slots precisely and automatically locates the hall effect sensor with respect to the associated stator windings of the stator assembly for the machine. The enclosure includes adequate space provisions for any associated electrical interconnections required for passing the hall effect signal to an associated motor control.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENT

Figure 1:
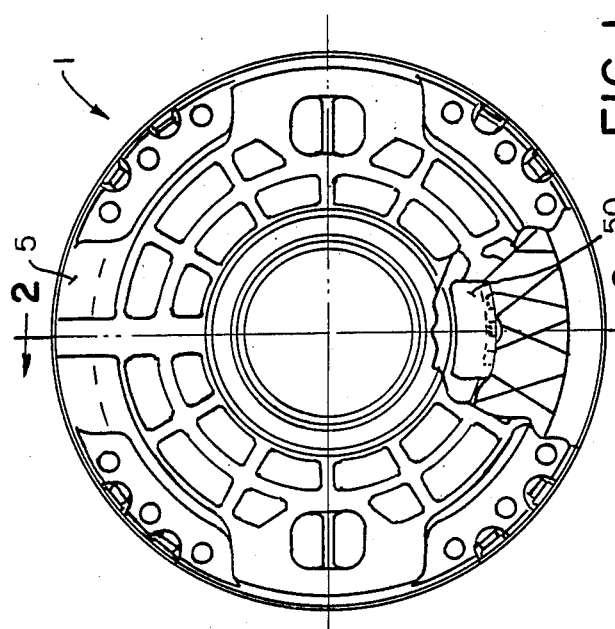
FIG. 1 is an end view of one illustrative embodiment of a dynamoelectric machine in the form of a brushless permanent magnet motor employing one illustrative embodiment of the hall effect assembly of this invention.
Figure 2:
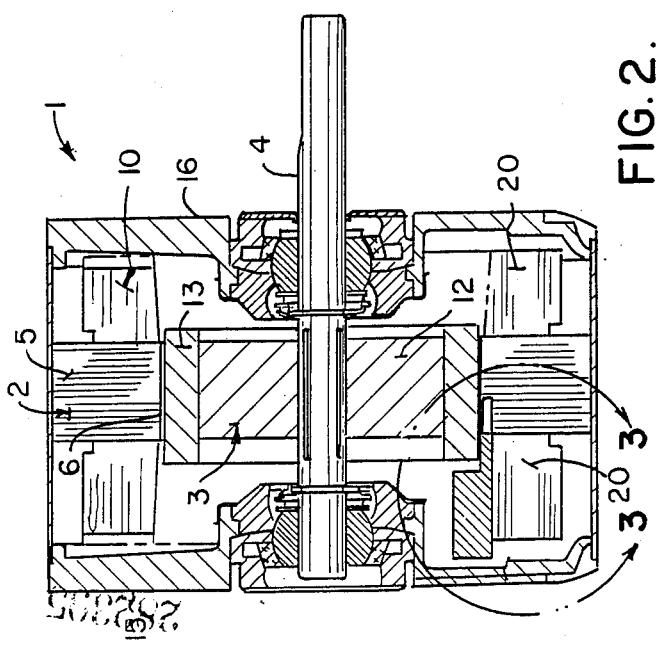
FIG. 2 is a sectional view taken along the line 2—2 of FIG. 1.

Referring now to FIGS. 1 and 2, reference numeral 1 indicates a dynamoelectric machine in the form of a brushless permanent magnet motor. The motor 1 includes a stator assembly 2 and a rotor assembly 3. In the embodiment illustrated, the rotor assembly 3 is mounted on a shaft 4. The shaft 4 is supported at two points on suitable bearings housed in endshields 15 and 16 respectively.

Figure 6:
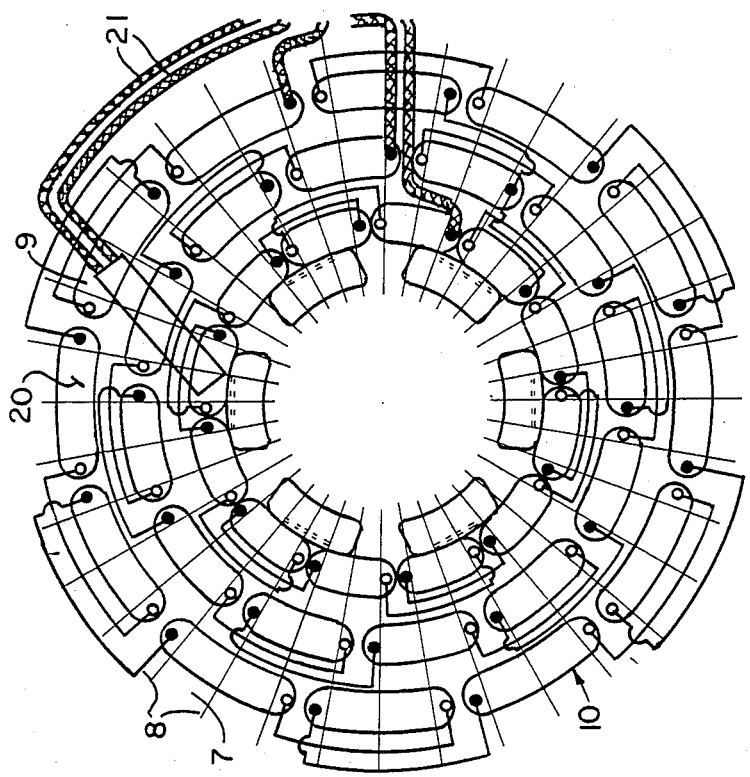
FIG. 6 is a diagrammatic view of a stator assembly showing possible placement locations for the device of this invention as employed in the motor shown in FIG. 1 for a preselected direction of rotation.

The stator assembly 2 is conventional, and generally includes a core 5 constructed from a plurality of laminations constructed from a suitable electromagnetic material. The core 5 generally has a central bore receiving opening 6 and a plurality of radially outwardly extending slots 7 formed in it. The slots 7 open on to the bore opening 6 at one end and are closed bottomed. The stator assembly configuration is diagrammatically illustrated in FIG. 6. As there shown, the plurality of radially extending lines represent stator teeth 8, and the areas between recessive teeth 8 represent the slots 7. A predetermined winding 10 configuration is disposed in the slots 7. In the embodiment shown, the windings 10 are arranged in a 12 pole, three phase configuration. The individual poles comprise a series of wire turns. The wire turns include straight conductor portions carried in the slots 7, and end turn portions 20 along each end face of the core. The end turn portions 20 each span three of the teeth 8 in the embodiment illustrated. The stator lamination therefore is designed to have 36 of the slots 7, and the physical winding poles are rotated with respect to one another as is well known in the art. Further, the stator assembly may include a protector 9 which is associated with the motor winding in a known manner. The various electrical connections between motor leads 21 and the windings 10, and between the poles of the winding 10 also are shown in FIG. 6.

The rotor assembly 3 likewise includes a core 12. The core has a plurality of surface mounted magnets 13 attached to it in a manner known in the art. The motor 1 per se forms no part of the invention disclosed herein. As will be appreciated by those skilled in the art, brushless permanent magnet motors are operated by energizing selected ones of the windings 10 to drive the rotor in a predetermined manner.

Figure 4:
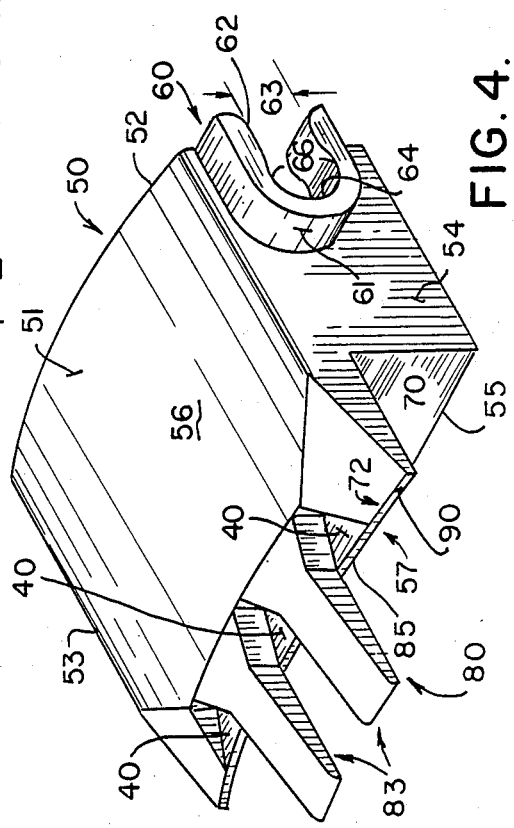
FIG. 4 is an enlarged view the enclosure utilized in conjunction with the hall effect device shown in FIG. 1.

As indicated above, it is known to use hall effect sensors to obtain an indication of rotor position from the magnet or magnets forming a part of the rotor 3. I have devised a simple yet extremely efficient way of mounting the hall effect sensors to the stator assembly 2 so that the sensors may be positioned properly by manufacturing personnel, and so that installation may be accomplished expeditiously. These results are achieved by use of an assembly means or fixture 50, best seen if FIG. 4 and 5. As there shown, the assembly means 50 includes an enclosure 51. The enclosure 51 is formed of and open top 52, sides 53 and 54, a front 55, a back 56, and a lower side 57. The various walls 52 through 57 delimit a chamber 58.

Figure 5:
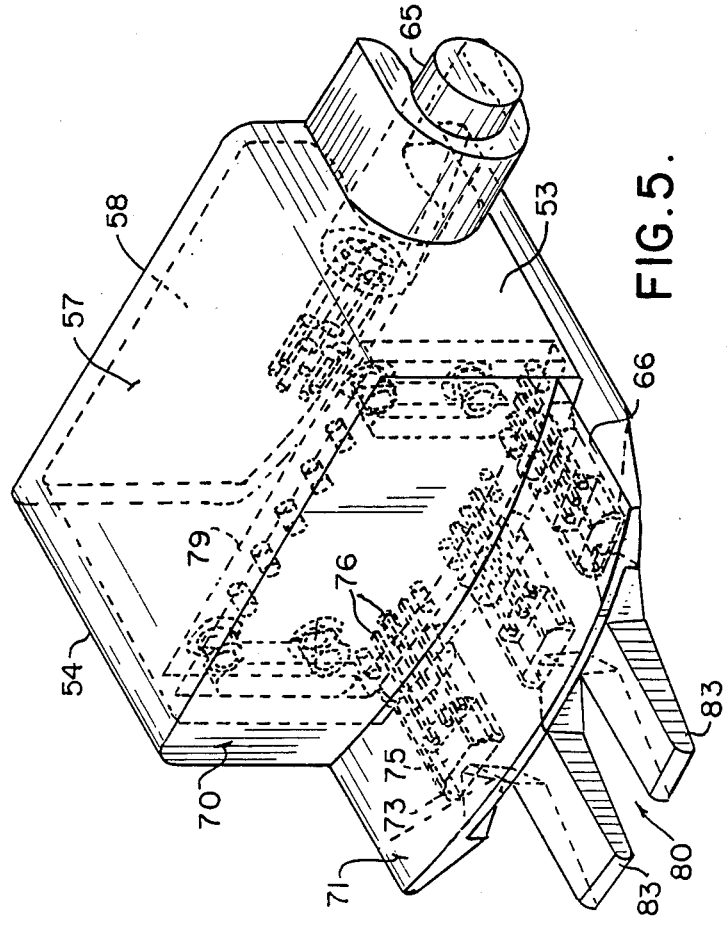
FIG. 5 is a diagrammatic view corresponding to FIG. 4 illustrating the interconnection of the hall effect device with an associated circuit board and lead device.

Either the side 54 or the side 53 has a channel 60 formed in it. The channel 60 is defined in part by a C-shaped collar 61. An inner wall 62 of the collar 61 forms a narrowed mouth portion 63, and a closed bottomed enlarged portion 64. The mouth 63 is sized to receive a cable 65 in a friction fit and to hold it in place to prevent movement of the cable 65, as is best seen in FIG. 5. As may be observed, the channel 60 is shown formed in the side 54 in FIG. 4, and in the side 53 in FIG. 5. Either arrangement works well.

As indicated above, the enclosure 51 is open along the top 52. The lower side 57 of the enclosure 51 delimits a mounting means 66 for reception of the hall effect sensors. That is to say, the mounting means 66, as best seen in FIG. 5, delimits a shoulder 70 and an extension 71. The extension 71 has a predetermined thickness 72. Within the thickness 72 is formed at least one pocket 73, sized for reception of a respective hall effect sensor 75. The preferred embodiment, as illustrated employs three pockets 73 and three of the sensors 75, shown positioned in the enclosure 51 in FIG. 5. The sensors 75 have a plurality of electrical connections 76 associated with them. The connections 76 are designed to mate and electrically connect, as necessary, with the cable 65 along a circuit board 79. The circuit board 79 acts to connect the sensors 75 to their associated leads in the cable 65 in some predetermined arrangement.

The enclosure 51 includes an attachment means 80 for mounting the assembly 50 to the stator 2. Means 80 includes at least one and preferably two locator tangs 83. The tangs 83 extend outwardly from the lower side 57 of the enclosure 51 and are centered between adjacent hall effect sensors 75, as is best seen in FIG. 5. The tangs are integrally formed with the enclosure 51 and are sized so that the width of the tangs 83 and the spacing between them are such that the tangs 80 fit in adjacent slots 7 of the stator assembly 2.

Figure 3:
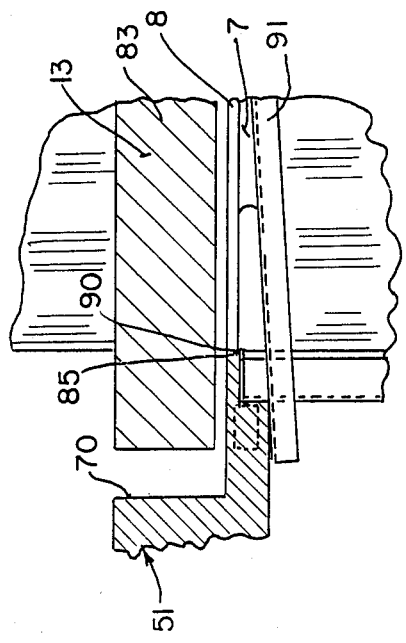
FIG. 3 is an enlarged view taken along about the area 3—3 of FIG. 2.

Referring now to FIG. 3, it is observed that an edge 85 of the enclosure 51 delimits a stop 90 with the stator assembly 2 in the installed position of the assembly 50. That is, each tang 83 is sized to fit within the stator slots 7 defined by adjacent teeth of the stator assembly 2, thereby positioning the enclosure 51 properly with respect to the stator assembly. It should be noted that one tooth, which should appear in cross-section, has been removed for drawing simplicity and to enable one to view the tang and wedge interaction. As will be appreciated by those skilled in the art, slot wedges 91, which are generally inserted internally of the slots of the stator assembly, may be employed during in the construction of the motor 1. The tangs 83 are designed to fit between adjacent teeth 8 and a slot wedge 91, in the installed position of the assembly 50. The slot wedge 91, conventionally constructed from electrically insulated material, for example Mylar, manufactured by the E. I. Du Pont de Nemours & Co., Inc. Mylar has a certain amount of resiliency inherent in the material. This resiliency helps to bias the tangs 83 between the windings, on one side of the slot wedges 90 and the tips of the teeth of the stator core 5, aiding in the maintenance of the position of the assembly means 50. The hall effect sensors 75 will be positioned properly merely by inserting the tangs 83 in the slots 7, and forcing the enclosure 51 against the end lamination of the stator core 5 against one another until the edge 85 of the enclosure 51, acting as a stop, prevents further movement of the assembly 50.

I also have found that the shape of th tangs 83 is important. That is, preferably, the tangs 83 are formed to define a clearance notch 40, which, in the embodiment illustrated, is "V" shaped. The notch 40 provides clearance for insulation cuffs of slot liner insulation often employed to insulate the bottom of the slots 7 in motor construction where the present invention finds application.

Figure 7:
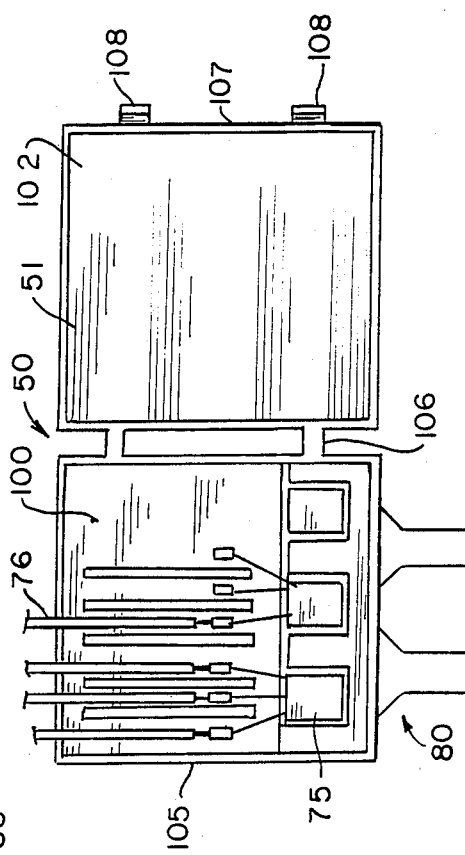
FIG. 7 is a view of a second illustrative embodiment of hall effect assembly of the present invention.

A second illustrative embodiment of the assembly means 50 is shown in FIG. 7. In this particular embodiment, the enclosure 51 generally is rectangular, but is designed as a two part piece, including a first sensor 75 receiving part 100 and a cover 102. The sensor receiving part 100 is generally rectangular in plan, and a lip 105 extends along at least one edge of the enclosure. The part 102 is attached to the part 1090 along a pair of hinges 106. An edge 107 of the part 102 has snap locks 108 integrally formed with the cover, which engage the lip 105 in the closed position of the enclosure 50, not shown.

As thus shown and described, a device meeting all the objects herein set forth has been described.

Numerous variations, within the scope of the appended claims, will be apparent to those skilled in the art in light of the foregoing description and accompanying drawings. Thus, the design of the enclosure 50 may be varied in other embodiments of the invention. In addition to those variations set forth above, the design of the tangs 83 may be changed in other embodiments of my invention. For example, the spacing, size or number of tangs may be altered. While a three phase brushless PM motor is described, other winding configurations, and consequent changes in the number of hall effect devices, are contemplated within the scope of the invention. Likewise, a single pocket may house multiple sensors 75, if desired. Materials used for the construction of the enclosure may vary in other embodiments thereof. These variations are merely illustrative.

Having thus described the invention, what is claimed and desired to be secured by Letters Patent is:

1. Apparatus for precisely positioning a hall effect sensor in a dynamoelectric machine having a rotor assembly including a rotatable therewith, and a stator assembly radially outwardly spaced from the rotor assembly, the stator assembly including a plurality of circumferentially spaced teeth defining winding receiving slots and a stator winding in the slots, the apparatus comprising:

at least one hall effect sensor;
a mounting fixture in which the sensor is installed; and,
attachment means for attaching the mounting fixture to a portion of the stator assembly whereby when the fixture is attached, the sensor is precisely positioned with respect to the stator winding.

2. The apparatus of claim 1 wherein the mounting fixture includes an assembly for holding three sensors precisely spaced with respect to one another in a predetermined arrangement.

3. The apparatus of claim 2 wherein the assembly is L-shaped with one arm of the L-shape adapted to receive the sensors.

4. The apparatus of claim 1 wherein the slots of the stator assembly have a slot wedge inserted in them, and the attachment means includes a locator tang projecting outwardly from the fixture and installable between the teeth and the wedge to capture the fixture.

5. The apparatus of claim 4 wherein the attachment means includes a pair of locator tangs which are respectively received in adjacent slots in the stator assembly.

6. The apparatus of claim 5 wherein the fixture is attached to the stator assembly by insertion of the locator tangs between the ends of adjacent stator teeth and the slot wedge, and the locator tangs taper outwardly from the fixture to facilitate installation of the tangs in the slots.

7. The apparatus of claim 6 wherein the tangs are integrally formed with the fixture.

8. The apparatus of claim 3 wherein pockets are formed in the said one arm assembly and the sensors are received in the pockets.

9. The apparatus of claim 8 further including a channel formed in the opposite end of the assembly from the arm in which the pockets are formed for receiving a connector cable for electrically connecting the sensors to an outlet of the machine.

10. The apparatus of claim 9 further including a shoulder extending outwardly from a sidewall of the assembly adjacent the channel to protect a cable installed in the channel from chafing.

11. In a dynamoelectric machine including a stator assembly and a rotor assembly, the rotor assembly including a central bore and winding receiving slots extending outwardly from and opening onto such bore, and windings in said slots, the improvement comprising means for mounting at least one hall effect sensor with respect to said windings, said mounting means including an enclosure in which the sensor is installed, an attachment means for attaching the enclosure to a portion of the stator assembly whereby the enclosure is attached to the stator assembly, and the sensor is precisely positioned with respect to the stator windings.

12. The improvement of claim 11 further including at least one tang insertable in the slots of the stator assembly for positioning the enclosure.

13. The improvement of the claim 12 wherein the tang further includes a clearance groove formed to provide clearance between the tang and insulative material associated with the stator assembly along a bottom of said slots.

14. The improvement of claim 13 wherein the enclosure includes a plurality of pockets containing three sensors precisely spaced with respect to one another in a predetermined arrangement.

15. The improvement of claim 14 wherein the enclosure is "L" shaped, with one arm of the assembly adapted to receive the sensors.

16. The improvement of claim 14 wherein the enclosure is in two parts, the parts being hingedly mounted with respect to one another.

17. The improvement of claim 16 wherein the hinges are integrally formed with the enclosure parts.

* * * * *

UNITED STATES PATENT AND TRADEMARK OFFICE
CERTIFICATE OF CORRECTION

PATENT NO. : 4,847,527

DATED : July 11, 1989

INVENTOR(S) : L. Ranney Dohogne

It is certified that error appears in the above-identified patent and that said Letters Patent is hereby corrected as shown below:

```
Column 4, line 16 "th" should be --the--.
Column 4, line 31 "1090" should be --100--.
Column 4, line 58 "rotatable therewith" should be
--rotatable shaft and rotor magnet attached to the shaft
  and rotatable therewith--.
Column 6, line 4, "the rotor assembly" should be - the stator
assembly --.
```

Signed and Sealed this

Third Day of July, 1990

*Attest:*

HARRY F. MANBECK, JR.

*Attesting Officer*  *Commissioner of Patents and Trademarks*